(12) United States Patent
Wan et al.

(10) Patent No.: US 11,538,269 B2
(45) Date of Patent: Dec. 27, 2022

(54) OPTICAL FINGERPRINT SENSOR FOR LCD PANEL

(71) Applicant: OmniVision Technologies, Inc., Santa Clara, CA (US)

(72) Inventors: Tsung-Wei Wan, Hsinchu County (TW); Wei-Ping Chen, New Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/243,176

(22) Filed: Apr. 28, 2021

(65) Prior Publication Data

US 2022/0350983 A1 Nov. 3, 2022

(51) Int. Cl.
*G06V 40/13* (2022.01)
*G02F 1/1335* (2006.01)
*G02B 13/14* (2006.01)

(52) U.S. Cl.
CPC ......... *G06V 40/1318* (2022.01); *G02B 13/14* (2013.01); *G02F 1/133514* (2013.01)

(58) Field of Classification Search
CPC ............... G06V 40/1318; G02B 13/14; G02F 1/133514; G06F 2203/0338
USPC .......................................................... 382/124
See application file for complete search history.

(56) References Cited

U.S. PATENT DOCUMENTS

2011/0122071 A1* 5/2011 Powell .................... G06F 3/041
345/173
2019/0286869 A1* 9/2019 Ling ....................... G06F 3/042

FOREIGN PATENT DOCUMENTS

CN 109496314 A 3/2019

* cited by examiner

*Primary Examiner* — Edward J Glick
*Assistant Examiner* — William D Peterson
(74) *Attorney, Agent, or Firm* — Lathrop GPM LLP

(57) ABSTRACT

An optical fingerprint sensor (OFPS) for use with a liquid-crystal display (LCD) panel having a backlight module is positioned under the backlight module and captures an image of a fingerprint sensing area on the LCD panel through an aperture in both a reflector and a metal shield of the backlight module. The OFPS includes a sensor layer, a wafer-level optic layer bonded to the sensor layer and an infrared pass filter (IRPF) coating formed on a substantially flat top surface of the wafer-level optic layer. An OFPS may be formed with a flat top and may include a wafer-level optic layer having one or more lenses to direct light generated by a light source beneath the wafer-level optic layer. The wafer-level lenses may be bonded with the fingerprint scanner. The flat top of the OFPS may be made with an IRPF coating.

20 Claims, 10 Drawing Sheets

OPTICAL FINGERPRINT SENSOR FOR LCD PANEL

BACKGROUND

Since the introduction of smartphones, one of the clearest usability evolutions has been how we unlock devices. We have moved from typing in passcodes, to fingerprint scanners, to facial recognition; but the device employed more and more is the in-screen fingerprint scanner. Fingerprint sensing (e.g., using a fingerprint scanner) is an increasingly common tool for authorizing (a) access to electronic devices, such as smartphones, (b) access to confidential electronic records, and (c) electronic transactions such as financial transactions carried out over the Internet. Fingerprint sensing satisfies market demand for an authentication mechanism that eliminates the need to enter (and remember) a passcode, and eliminates the need to keep track of multiple different passcodes associated with different devices and/or accounts. Fingerprint sensing is a well-established form of biometric identification. Optical fingerprint sensors (OFPSs) have been used for years, for example by law enforcement agencies.

Several different types of fingerprint sensors have been designed for use in smartphones and other mobile devices. Each of these types of fingerprint sensors images a finger to obtain the fingerprint. Optical fingerprint scanners (OFPS) are used for Organic Light-Emitting Diode (OLED) panels currently, but are not currently used with liquid crystal display (LCD) panels. On devices such as smart phones, fingerprint scanners are typically located under the display however, positioning OFPSs underneath LCD panels may encounter backlight module reflection and protection anomalies. Such backlight modules in mobile devices for example may employ a visible reflective coating and/or metal shield (e.g., a bottom layer that forms a cover of the backlight module), which may be used to provide a relatively uniform screen light distribution for such devices. These coatings and metal shield, however, also block light from transferring to an integrated OFPS.

As such, OFPSs have generally not been integrated under LCD displays. Rather, OFPSs have more typically been located under an LCD non-display area. Locating OFPSs under the non-display areas, however, reduces the aspect ratio for the display.

SUMMARY OF THE INVENTION

According to the disclosure hereinbelow, an optical fingerprint sensor (OFPS) is made with a light source, and may include a reflector, an infrared (IR) pass filter (IRPF) coating, a wafer-level optic layer, and an image sensor, in embodiments. To place an OFPS underneath the LCD screen, a hole is formed through a backlight module. The backlight module is for example of the type with a reflective coating and a metal shield, so that the hole extends through the reflective coating and a metal shield. In this way, light transfer with the OFPS is not obstructed. In some examples, the OFPS is equipped with a backlight shield to block incoming light from the backlight module.

Additionally, or alternatively, the OFPS may be formed (e.g., manufactured) with a flat top (e.g., a substantially planar surface). This OFPS may include a wafer-level optic layer, where the wafer-level optic layer includes one or more lenses to direct light generated by a light source (e.g., a near-infrared (NIR) light source) beneath the wafer-level optic layer. In some examples, the wafer-level lenses are bonded with the fingerprint scanner. A top wafer-level lens may be formed with flat glass on a top side such that a top surface of the top wafer-level lens is flush with the flat glass. In some examples, the flat top of the OFPS is made with an IRPF coating.

In an embodiment, wherein the aperture is formed in the reflective coating and the metal shield during manufacture of the backlight module. The aperture may be aligned with the fingerprint sensing area when the backlight module is coupled with the LCD panel.

In further embodiments, the wafer-level optic layer having a substantially flat top surface for coupling with a substantially flat surface of the backlight module within the aperture, the IRPF coating may have properties that reflect visible light and allow infrared light to pass through and the reflectivity of visible light of the IRPF coating substantially may match reflectivity of visible light of the reflector. Further, the IRPF coating may include a glass surface.

In another embodiment, the OFPS may include an infrared light source for projecting infrared light towards the fingerprint sensing area. Further, the infrared light source may include one or more optical elements for directing the infrared light towards the fingerprint sensing area.

In yet another embodiment, the wafer-level optic layer further includes a single wafer-level lens for imaging the fingerprint sensing area to the sensor layer. Further, the single wafer-level lens may be able to image an object with a greater height at the fingerprint sensing area as compared to imaging by multiple wafer-level lenses to image the object.

In an embodiment, the wafer-level optic includes an array of wafer-level lenses, wherein different ones of the array of wafer-level lenses form an image of a different part of the fingerprint sensing area to a different part of the sensor layer.

In further embodiments, the array of wafer-level lenses may be able to image an object at the fingerprint sensing area with a greater size and/or a greater resolution as compared to imaging the object using a single wafer-level lens, each lens of the array of wafer-level lenses may include an entrance pupil on top of the lens or the array of wafer-level lenses may be formed as island lenses in the wafer-level optic layer.

In further embodiments, the sensor layer may capture a raw image of a finger at the fingerprint sensing area, where the raw image comprises a plurality of sub-images that may be processed using an algorithm that stitches the plurality of sub-images together to form an image of the finger. Yet further, the algorithm comprises machine readable instructions that are executable by a processor of an electronic device that includes the LCD panel, the backlight module and the OFPS.

In other embodiments, the OFPS may be positioned directly beneath the fingerprint sensing area, the OFPS may capture an image of a finger pressed against the fingerprint sensing area via the LCD screen, and the OFPS may include a backlight shield configured to block at least a portion of incoming light from the backlight module.

Thus, according to these and other various techniques described herein, an OFPS may advantageously be disposed beneath (or, alternatively referred to herein as "under" or "below") a display area of an LCD panel without blocking light from interfering with its performance.

DETAILED DESCRIPTION OF THE EMBODIMENTS

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" may encompass both an orientation of above and below. The device may be otherwise oriented (rotated ninety degrees or at other orientations) and the spatially relative descriptors used herein interpreted accordingly. In addition, it will also be understood that when a layer is referred to as being "between" two layers, it may be the only layer between the two layers, or one or more intervening layers may also be present.

The term semiconductor substrate may refer to substrates formed using semiconductors such as silicon, silicon-germanium, germanium, gallium arsenide, and combinations thereof. The term semiconductor substrate may also refer to a substrate, formed of one or more semiconductors, subjected to previous process steps that form regions and/or junctions in the substrate. A semiconductor substrate may also include various features, such as doped and undoped semiconductors, epitaxial layers of silicon, and other semiconductor structures formed upon the substrate.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meanings.

Figure 1:
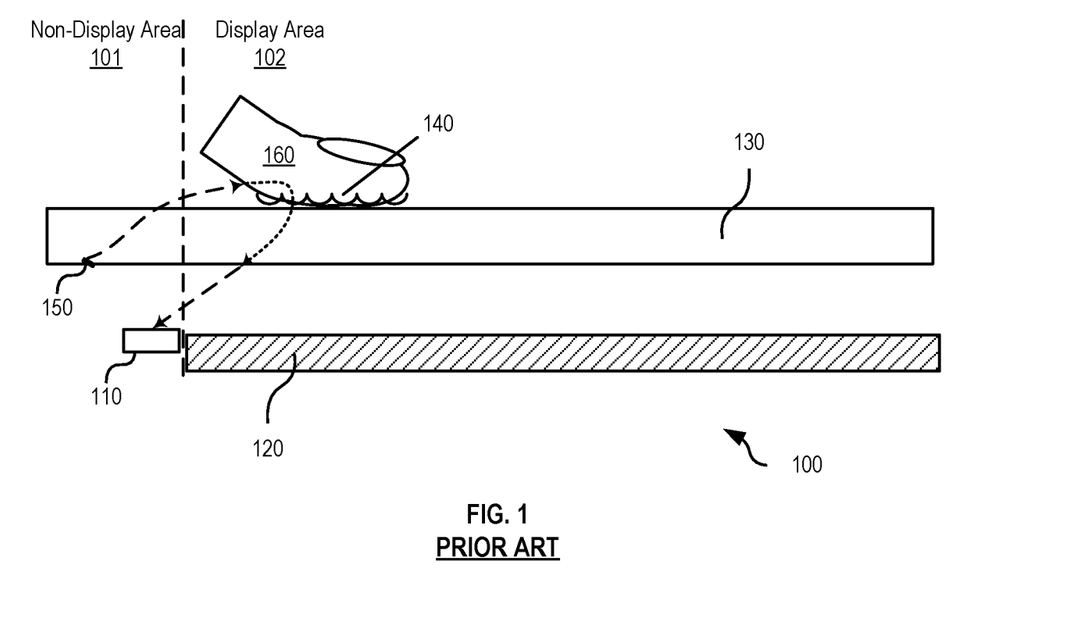
FIG. 1 is a cross-sectional side view illustrating a prior art optical fingerprint sensor with a fingerprint sensing region positioned above a display area of a liquid crystal display (LCD) panel, and an image sensor located under a non-display area.

FIG. 1 is a cross-sectional side view illustrating a prior art optical fingerprint sensor (OFPS) 100 with a fingerprint sensing region 140 positioned above a display area 102 of a liquid crystal display (LCD) panel 130, and an image sensor 110 located under a non-display area 101. Image sensor 110 is positioned under panel 130 in non-display area 101 of LCD panel 130 because a backlight module 120 (or multiple backlight modules) used to illuminate LCD panel 130 with a uniform light impedes operation of OFPS 100 when image sensor 110 is positioned in display area 102. If image sensor 110 was located in display area 102, light emitted by backlight module 120 would impinge image sensor 110 and prevent capture of fingerprint images. Positioning image sensor 110 in non-display area 101 reduces the problem caused by light from backlight module 120, but adversely impacts performance of OFPS 100 to capture fingerprint images.

Light 150 is emitted by a light source of OFPS 100 at an angle, reflected/refracted by a finger 160 positioned at fingerprint sensing region 140 of the screen, and is detected by image sensor 110. However, positioning of image sensor 110 in non-display area 101 reduces the aspect ratio of display area 102 because non-display area 101 is not available to display content, as compared to when image sensor 110 is positioned directly beneath fingerprint sensing region 140 so that all of LCD panel 130 may be used for display, for example. Accordingly, to compensate for the positioning of image sensor 110 in non-display area 101, the cost of OFPS 100 is increased and manufacturing is more difficult.

Figure 2A:
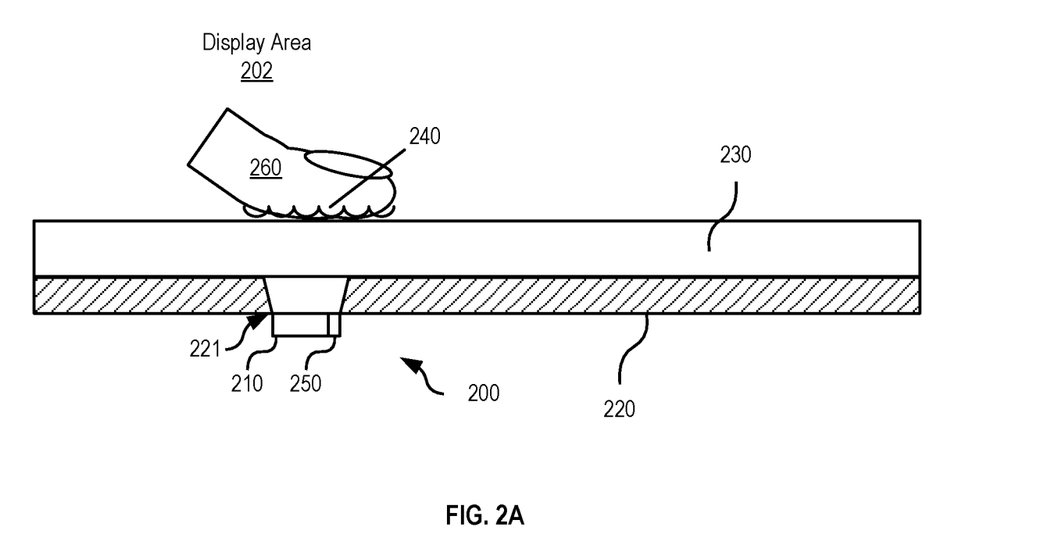
FIG. 2A is cross-sectional side view of one example of an optical fingerprint sensor (OFPS) positioned in a display area of an LCD panel for capturing a fingerprint image of a finger positioned at a fingerprint sensing area on a surface of the LCD panel, in embodiments.

FIG. 2A is cross-sectional side view of an example OFPS 200 positioned in a display area 202 of an LCD panel 230 for capturing a fingerprint image of a finger 260 (or any other object) positioned at a fingerprint sensing region 240 on a surface of LCD panel 230. The OFPS 200 includes an image sensor 210 and near infrared (NIR) light source 250 positioned at an aperture 221 formed in bottom layers (e.g., see FIG. 2B) of a backlight module 220 of LCD panel 230. Aperture 221 is positioned directly below fingerprint sensing region 240. In embodiments, NIR light source 250 generates light having a wavelength of approximately 940 nm however, other wavelengths may be used.

Figure 2B:
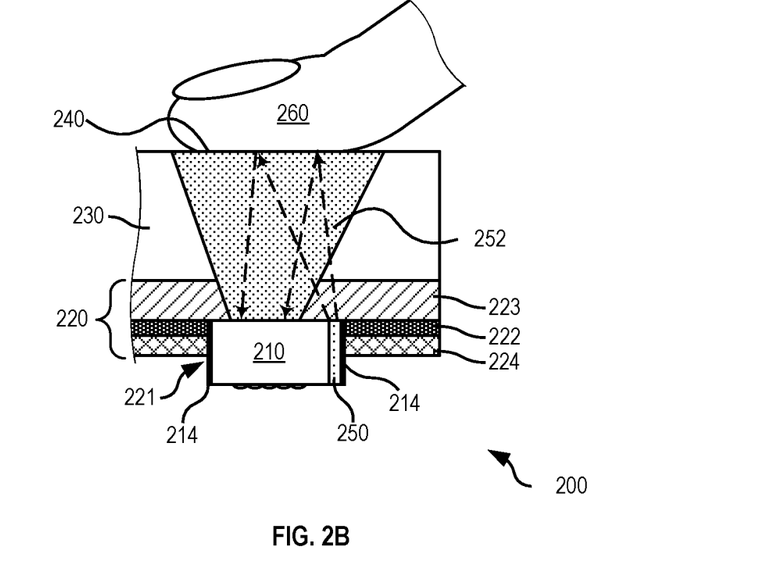
FIG. 2B shows the OFPS, LCD panel, and backlight module of FIG. 2A in further detail, in embodiments.

FIG. 2B shows OFPS 200, LCD panel 230, and backlight module 220 of FIG. 2A in further example detail. FIGS. 2A and 2B are best viewed together with the following description. Backlight module 220 may include a reflector 222 that reflects visible light and a metal shield 224 that forms a lower surface of backlight module 220. In order for OFPS 200 to operate from beneath LCD panel 230, aperture 221 is formed in backlight module 220, including in reflector 222 and metal shield 224. For example, during manufacture of backlight module 220, aperture 221 is formed through backlight module 220, including reflector 222, light guide plate 223 and metal shield 224. Aperture 221 allows transfer of light 252 from light source 250 to fingerprint sensing region 240 and back to image sensor 210 without obstruction from backlight module 220. In certain embodiments, OFPS 200 may include a black light shield 214 that blocks light from backlight module 220 from impinging image sensor 210.

Figure 2C:
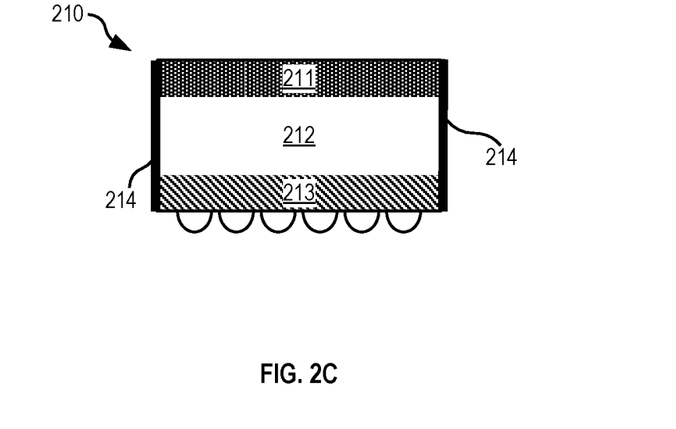
FIG. 2C shows the image sensor of FIGS. 2A and 2B in further detail, in embodiments.

FIG. 2C shows image sensor 210 of FIGS. 2A and 2B in further example detail. Image sensor 210 includes a sensor layer 213 (e.g., an array of black and white photo sensors), a wafer-level optic layer 212, and an infrared (IR) pass filter (IRPF) coating 211 (or, additionally or alternatively, any other pass filter surface). In certain embodiments, light source 250 is coupled with, or included with, wafer-level optic layer 212 which may include one or more lenses, or other optical components, that direct IR light generated by light source 250 towards fingerprint sensing region 240. In embodiments, black light shield 214 is a black material or coating on side surfaces of image sensor 210.

In preferred embodiments, OFPS 200 is formed (e.g., manufactured) with a flat top surface (e.g., a substantially planar surface), whereby wafer-level optic layer 212 is formed with a substantially planar upper surface. In certain embodiments, the flat top surface is formed of glass. Wafer-level optic layer 212 may include one or more lenses to direct light 252, generated by light source 250 and reflected/refracted by finger 260, onto sensor layer 213. Light source 250 may emit light 252 (e.g., electromagnetic (EM) radiation) at a particular wavelength or particular wavelengths, such as near infrared, to illuminate fingerprint sensing region 240.

Wafer-level optic layer 212 may include one or more single, simple wafer-level lenses and/or one or more complex wafer-level lenses that are bonded (e.g., mechanically, chemically, or via another coupling technique) to sensor layer 213. Wafer-level optic layer 212 may include other optical components without departing from the scope hereof. A top wafer-level lens is preferably formed with a substantially flat top surface and coated with IRPF coating 211 such that IRPF coating 211 contacts, and sit flush against, a substantially flat bottom surface of LCD panel 230 or light guide plate 223, as shown in FIG. 2B. In certain embodiments, IRPF coating 211 transmits light at least at a wavelength of 940 nanometers (nm), but may be configured to transmit light at other wavelengths without departing from the scope hereof. Particularly, IRPF coating 211 is a visibly reflective coating that appears similar to a coating applied to a lower surface of LCD panel 230 when viewed from above. Advantageously, a user may not be aware that OFPS 200 is positioned beneath LCD panel 230 when not being used to capture fingerprint images.

As shown in the example of FIGS. 2A, 2B, and 2C, backlight module 220 is used to illuminate LCD panel 230 (e.g., via uniform lighting). As shown in FIG. 2B, the top surface of OFPS 200 may directly contact and interface with a bottom surface of backlight module 220/light guide plate 223 within aperture 221 formed in reflector 222 and metal shield 224 of backlight module 220. Accordingly, light 252 travels directly and uninterrupted between OFPS 200 and finger 260 positioned at fingerprint sensing region 240 on LCD panel 230 and OFPS 200 may capture fingerprint images of finger 260.

In some examples, the reflectivity of reflector 222 and IRPF coating 211 may be similar (e.g., having values within a degree of significance or less, at times). Since, as shown in FIGS. 2B and 2C, IRPF coating 211 may contact (or, e.g., coupled with or formed with such as via a manufacturing process) a bottom surface of backlight module 220/light guide plate 223 within aperture 221, and since the reflectance of IRPF coating 211 and reflector 222 are similar, light 252 may react uniformly, whether at OFPS 200 or reflector 222. In some examples, OFPS 200 may be formed based on backlight module 220, such that IRPF coating 211 has reflectance similar to (or the same as) that of backlight module 220 (or vice versa). In some examples, wafer-level optic layer 212 includes only a single wafer-level lens that has a wide display field of view (DFOV) to capture fingerprint sensing region 240, and can capture objects with relatively large heights. In alternative embodiments, where wafer-level optic layer 212 includes an array of wafer-level lenses, OFPS 200 provides a higher resolution and may have a capability to cover a larger fingerprint sensing region 240, and thereby is able to process light 252 from objects in a relatively larger sensing area as compared to other optics configurations.

Figure 3:
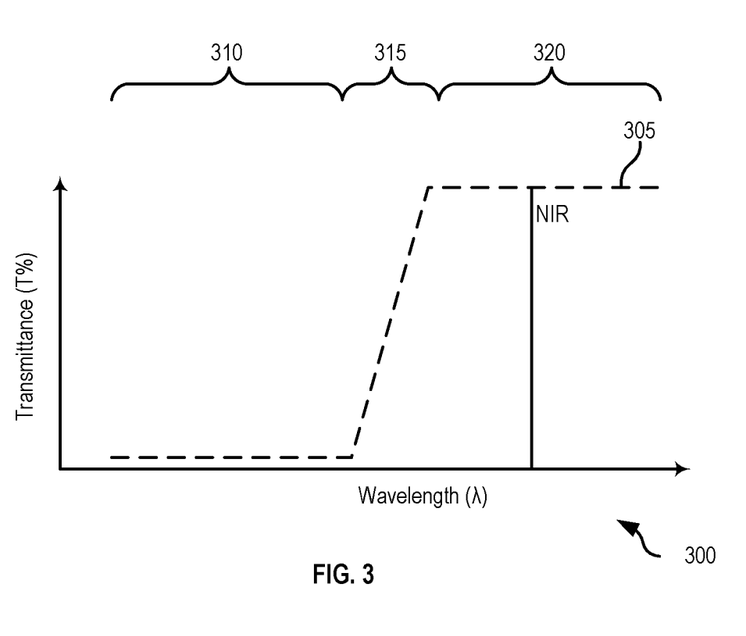
FIG. 3 is a graph illustrating example transmissive properties of the IRPF coating of FIG. 2C, in embodiments.

FIG. 3 is a graph 300 illustrating example transmissive properties of IRPF coating 211 of FIG. 2C. Graph 300 plots transmittance (T %) as a function of wavelength (λ), where a line 305 represents transmittance of IRPF coating 211, which may be approximately 940 nm, in embodiments. In a first wavelength region 310, IRPF coating 211 is substantially non-transmissive, and reflects all wavelengths of light. In a second region 315, IRPF coating 211 increasingly transitions from blocking to permitting transmittance of light. In a third region 320, IRPF coating 211 permits transmission of the light, including at a wavelength generated by NIR light source 250, for example.

Figure 4A:
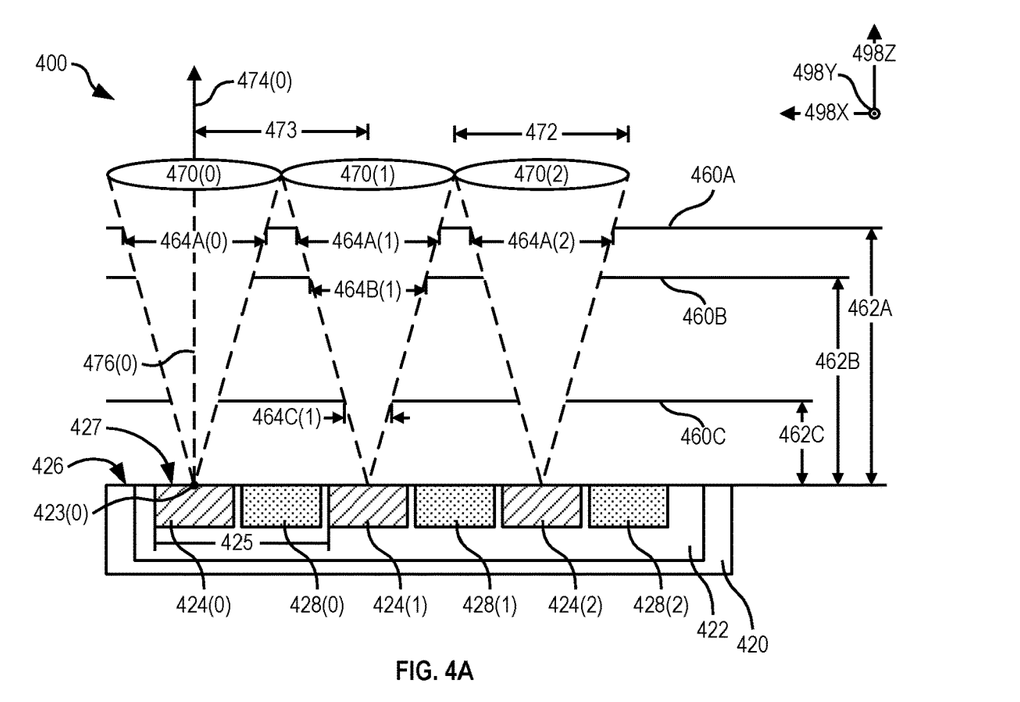
FIGS. 4A and 4B illustrate a cross-sectional side view of a portion of an OFPS that detects electromagnetic energy using a plurality of photodiodes, in embodiments.
Figure 4B:
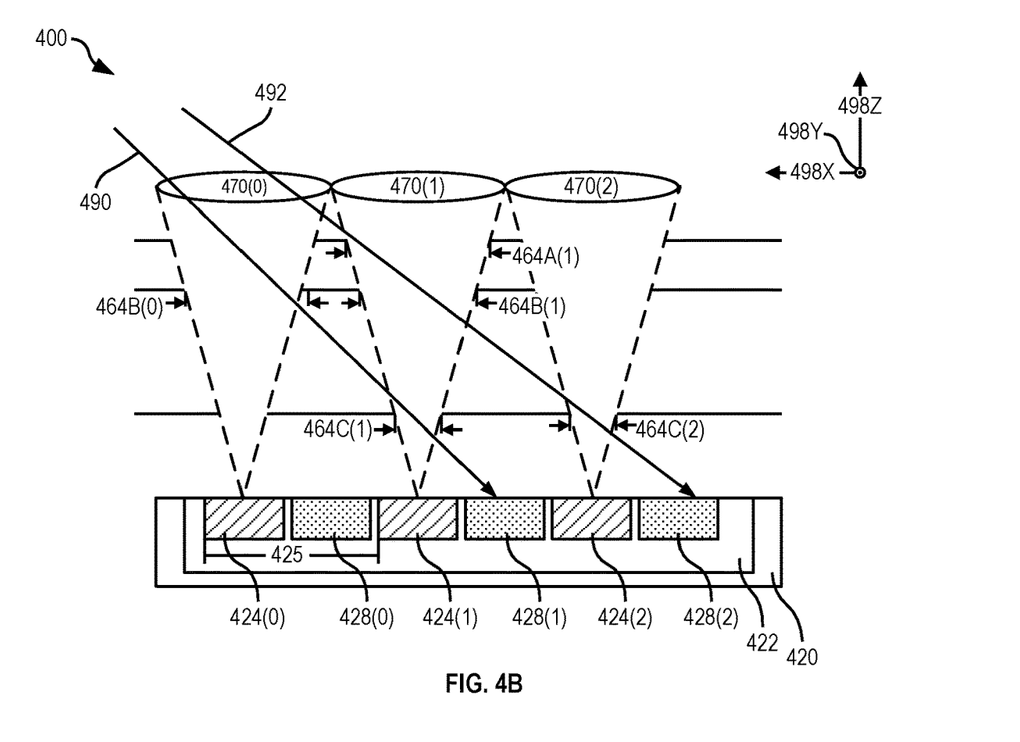

FIGS. 4A and 4B illustrate a cross-sectional side view of a portion of an OFPS 400, in embodiments. OFPS 400 detects electromagnetic energy using a pixel array 422 that includes a plurality of first photodiodes 424 and plurality of second photodiodes 428. The OFPS 400 is provided as an example of wafer-level optic layer 212; however, wafer-level optic layer 212 is not limited to this example, and may include other configurations without departing from the scope hereof The cross section illustrated in FIGS. 4A and 4B is parallel to a plane, hereinafter referred to as the x-z plane, formed by orthogonal axes 498X and 498Z, which are each orthogonal to an axis 498Y. A plane, hereinafter the x-y plane, formed by orthogonal axes 498X and 498Y, and planes parallel to the x-y plane are referred to as horizontal planes. Unless otherwise specified, heights of objects herein refer to the object's extent along axis 498Z. Herein, a reference to an axis x, y, or z refers to axes 498X, 498Y, and 498Z respectively. Also, herein, a width refers to an object's extent along the x axis, a depth refers to an object's extent along the y axis, a thickness (or thinness) refers to an object's extent along the z axis, and vertical refers to a direction along the z axis. Also, herein, above refers to a relative position a distance away along axis 498Z in the positive direction and below refers to a relative position a distance away along axis 498Z in the negative direction. FIGS. 4A and 4B are best viewed together.

OFPS 400 includes a plurality of lenses 470, an image sensor 420, and at least one apertured baffle-layer 460. The plurality of lenses 470 includes J lenses, 470(m=0), 470(1), 470(2) . . . 470(J-1). Each lens 470 has a lens width 472 and the plurality of lenses 472 has a lens pitch 473 along a horizontal direction. In FIGS. 4A and 4B, lens width 472 and lens pitch 473 are equal but lens width 472 may be smaller than lens pitch 473 without departing from the scope hereof. Lens 470(0) has a lens axis 474 that is parallel to axis 498Z. The plurality of lenses 470 is positioned above a light-sensitive surface 426 of image sensor 420. Image sensor 420 includes a pixel array 422 that includes a plurality of first photodiodes 424 that contains J photodiodes, 424(m=0), 424(1), 424(2) . . . 424(J-1). The plurality of first photodiodes 424 has a first photodiode pitch 425 that is equal to lens pitch 473 in the horizontal direction in the example of FIGS. 4A and 4B. A line that connects an optical center of each lens 470 and a center 423 of a light-sensitive surface 427 of each first photodiode 424 forms an optical axis 476 of a plurality of optical axes 476. Each optical axis of the plurality of optical axes 476 is normal to light sensitive surface 426. Each lens 470 has a lens axis 474 aligned with optical axis 476 of the respective first photodiode 424. In the embodiment illustrated in FIGS. 4A and 4B, the distance between each lens 470 and the corresponding first photodiode 424 is configured along with the focal length of lens 470 such that collimated electromagnetic energy incident on lens 470 from the positive z direction and parallel to optical axis 476 will be focused to center 423 of first photodiode 424. The plurality of first photodiodes 424 record light that is reflected from a fingerprint sample that is then used to generate a fingerprint image. In an embodiment, each first photodiode 424 is a sub-array of pixel array 422 including more than one photodiode.

Each apertured baffle-layer 460 is positioned between the plurality of lenses 470 and image sensor 420. Each of the at least one apertured baffle-layer 460 is located a respective height 462 above pixel array 422. The embodiment illustrated in FIGS. 4A and 4B includes three apertured baffle-layers, 460A, 460B, and 460C that are a height 462A, 462B, and 462C, respectively, above pixel array 422. The OFPS 400 may have more or fewer apertured baffle-layers 460 without departing from the scope hereof. The relative spacing and height of each apertured baffle-layer 460 above pixel array 422 is for illustrative purposes and is not meant to limit the possible configurations of apertured baffle-layers 460 within OFPS 400.

Each apertured baffle-layer 460 has a respective plurality of apertures stops 464 that contains J aperture stops, 464A(m=0), 464A(1), 464A(2) 464A(J−1). Each aperture stop 464 is center-aligned with a given first photodiode 424 along the corresponding optical axis 476. For example apertures stops 464A(0), 464A(1), and 464A(2) of apertured baffle-layer 460A are center-aligned with respective optical axes 476(0), 476(1), and 476(2). Some optical axes are not illustrated for clarity of illustration. In the embodiment illustrated in FIGS. 4A and 4B, aperture stops 464A(1), 464B(1), and 464C(1) are center-aligned with optical axis 476(1), not shown for clarity of illustration.

Pixel array 422 includes the plurality of second photodiodes 428 that contains k photodiodes, 428(m=0 ), 428(1), 428(2) . . . 428(k−1). The plurality of second photodiodes 428 is intercalated with the plurality of first photodiodes 424 such that a second photodiode 428(m) is between first photodiode 424(m) and first photodiode 424(m+1) in the horizontal direction. Each second photodiode 428 is configured to detect electromagnetic energy having passed through lens $L_m$ and at least one aperture stop $A_{x \neq m}$ not aligned with $L_m$ along the optical axis $O_m$. This is illustrated in FIG. 4B.

A ray of electromagnetic energy 490 passes through lens 470(m=0) and through aperture stop 464C(m=1). Another ray of electromagnetic energy 492 passes through lens 470(m=0) and through aperture stops 464A(m=1), 464B (m=1) and 464C(m=2). Both rays of electromagnetic energy 490 and 492 are detected by a second photodiode (428(1) and 428(2), respectively) of the plurality of second photodiodes 428.

Electromagnetic energy detected by the plurality of second photodiodes 428 enters OFPS 400 with a large angle of incidence with respect to light-sensitive surface 427. This large-angle electromagnetic energy is quantified here as incoming electromagnetic energy with an angle of incidence greater than ten degrees as measured from the surface normal of pixel array 422.

In an embodiment, each of apertured baffle-layers 460 is opaque to visible electromagnetic energy, for example, light incident on apertured baffle-layer 460 between adjacent apertures stops of the plurality of aperture stops 464. This reduces the number of paths that incoming electromagnetic energy may take and still be incident on the plurality of first photodiodes 424. As discussed earlier, each apertured baffle-layers 460 helps OFPS 400 record an image of a fingerprint sample.

Figure 5:
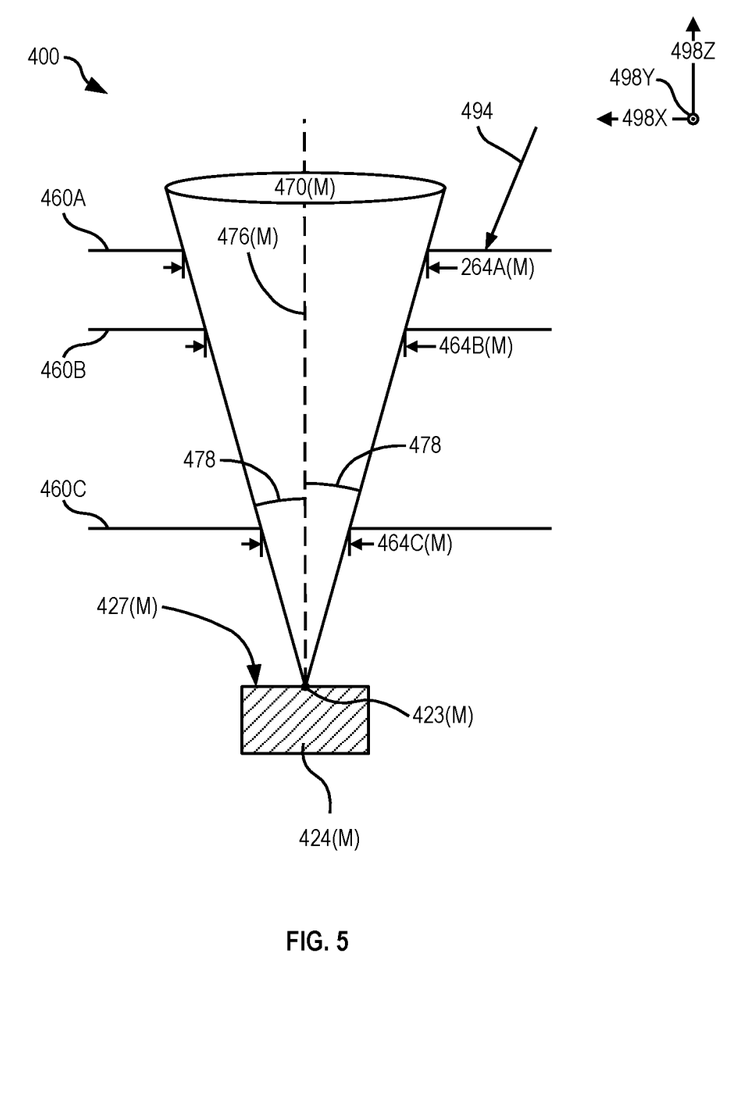
FIG. 5 is a schematic cross-sectional view of portion of the OFPS of FIGS. 4A and 4B, in embodiments.

FIG. 5 is a schematic cross-sectional view of portion of OFPS 400 of FIGS. 4A and 4B, showing first photodiode 424(m) and center 423(m) of light-sensitive surface 427(m). FIG. 5 also shows lens 470(m), optical axis 476(m), and the sections of the least one apertured baffle-layer 460A, 460B, and 460C that include apertures stops 464A(m), 464B(m), and 464C(m), respectively, as described with reference to FIGS. 4A and 4B and according to various other embodiments described herein.

Each of aperture stops 464A(m), 464B(m), and 464C(m) illustrated in FIG. 5 is center-aligned with optical axis 476(M). Each aperture stop 464A(m), 464B(m), and 464C (m) has a width such that they collectively transmit electromagnetic energy that falls within an acceptance angle 478, which is measured as an angular divergence from optical axis 476 of rays incident on center 423(M) of light-sensitive surface 427(m) of first photodiode 424(m). A ray of electromagnetic energy 494 with incident angle larger than acceptance angle 478 is prevented from striking first photodiode 424(m) when it is incident on apertured baffle-layer 460A. In an embodiment, each aperture stop of the plurality of aperture stops 464 on each of the at least one apertured baffle-layers is circular in a horizontal plane.

Figure 6:
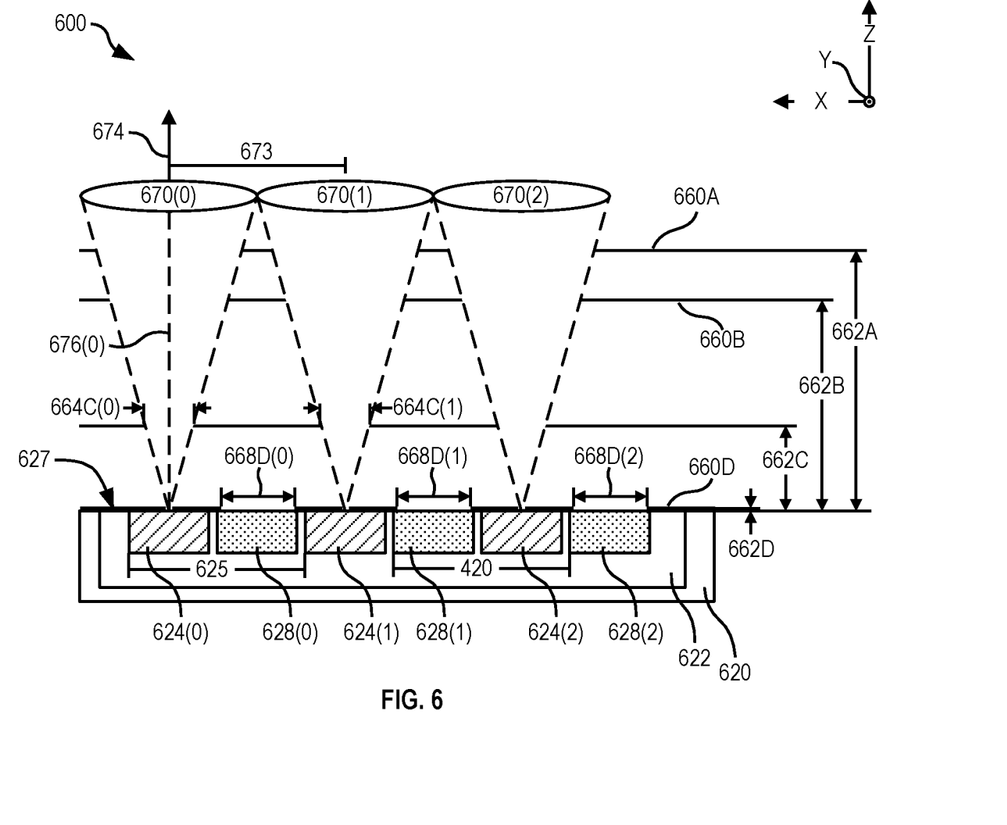
FIG. 6 is a schematic cross-sectional view of another OFPS, in embodiments.

FIG. 6 is a schematic cross-sectional view of another OFPS 600 according to embodiments described herein. The embodiment illustrated in FIG. 6 includes three apertured baffle-layers, 660A, 660B, and 660C that are a height 662A, 662B, and 662C, respectively, above pixel array 622. Similarly to apertured baffle-layers 460A, 460B and 460C of FIGS. 4A and 4B, each apertured baffle-layer has a respective plurality of apertures stops. OFPS 600 also includes at least a fourth apertured baffle-layer 660D at a distance 662D above a light-sensitive surface 627 of image sensor 620 (e.g., a black-and-white (BW) image sensor). Distance 662D is less than 20 microns, in embodiments. Apertured baffle-layer 660D has a plurality of aperture stops with J aperture stops 664D(0), 664D(1) . . . 664D(J−1) (not indicated) that are aligned with the optical axes of lenses 670(0), 670(1) . . . 670(J−1). Apertured baffle-layer 660D further includes a plurality of second aperture stops 668 with K aperture stops 668D(0), 668D(1) . . . 668D(K−1), there being one second aperture stop 668 for each second photodiode 628 of a plurality of second photodiodes 628. Each second aperture stop 668 is center-aligned with a center of a light-sensitive surface (not indicated) of a respective second photodiode 628 in a direction parallel to an optical axis 674, as illustrated in FIG. 6. The plurality of second aperture stops 668 on apertured baffle-layer 660D permit electromagnetic energy to be detected by the plurality of second photodiodes 628 while further restricting the paths available that allow electromagnetic energy to be detected by a plurality of first photodiodes 624. Distance 662D is optimized to maximally reduce the amount of electromagnetic energy incident on the plurality of first photodiodes 624. As such, distance 662D may be varied slightly depending on the fabrication processes used and the tolerances associated with those processes.

Figure 7:
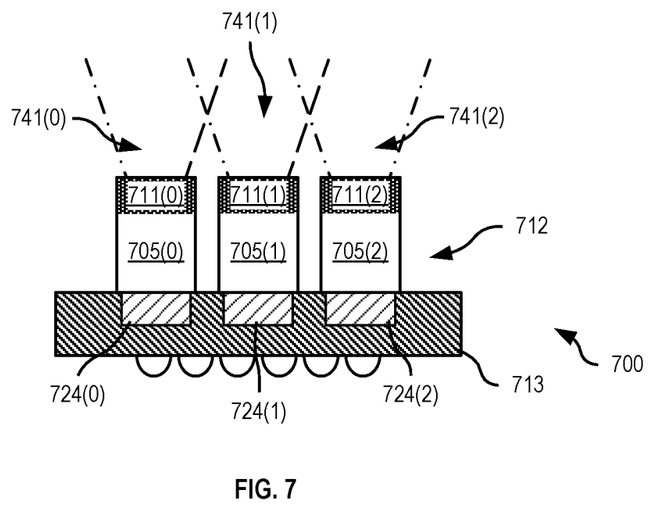
FIG. 7 is a schematic cross-sectional view of an OFPS where a wafer-level optic layer forms a plurality of islands that are bonded to a sensor layer, in embodiments.

In an embodiment, the number of first photodiodes 624 is equal to the number of second photodiodes 628. Accordingly, the number of lenses 670, the number of apertures stops on each apertured baffle-layer 660, and the number of second aperture stops 668 are also equal, both to each other and to the number of first photodiodes 624 and to the number of second photodiodes 628. More succinctly, the counters above, J and K, are equal. This need not be the case, however. The relative quantity of first photodiodes 624 and second photodiodes 628 may vary without departing from the scope hereof FIG. 7 is a schematic cross-sectional view of an OFPS 700 where a wafer-level optic layer 712 forms a plurality of islands 705 that are bonded to a sensor layer 713. Each island 705 forms at least one wafer-level lens having a substantially flat top with an IRPF coating 711 and a corresponding FOV 741. The at least one wafer-level lens (e.g., the corresponding island 705) directs light onto one sensor area 724 of sensor layer 713 (e.g., a BW image sensor). Each sensor area 724 may represent one sensor (e.g., one pixel), or a group of adjacent sensors (e.g., a block of adjacent pixels), or a group of spaced pixels (e.g., a block of interleaved pixels). Although the example of FIG. 7 shows three islands 705 and three sensor areas 724, OFPSs 700 may include more or fewer islands 705, sensor areas 724, and IRPF coatings 711, without departing from the scope hereof. OFPS 700 may be an example of one or more of OFPSs, 200, 400, and/or 600, as described with reference to FIGS. 2A through 6.

In the example of FIG. 7, the multiple wafer-level lenses implemented by islands 705 may provide OFPS 700 with a relatively wide DFOV that covers a relatively large fingerprint imaging area (e.g., similar to fingerprint sensing region 240 of FIG. 2A-2B) as compared to other optical configurations. In embodiments, islands 705 may have dissimilar lenses so that lenses with different functions may be combined in one image sensor.

Figure 8:
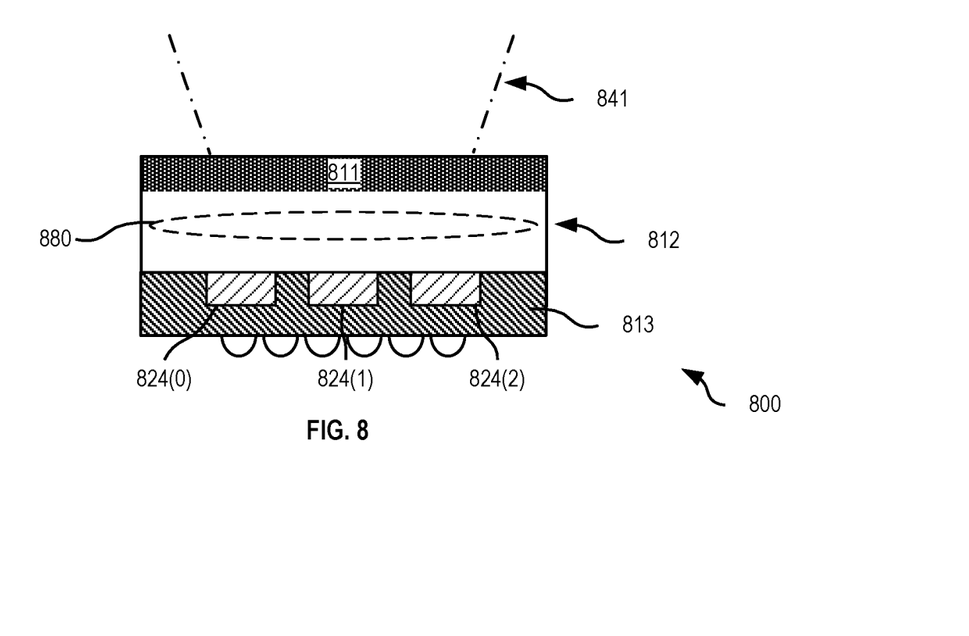
FIG. 8 is a schematic cross-sectional view of an OFPS with continuous wafer-level optic layer that forms a single wafer-level lens, in embodiments.

FIG. 8 is a schematic cross-sectional view of OFPS 800 with continuous wafer-level optic layer 812 that forms a single wafer-level lens 880, in embodiments. OFPS 800 may be an example of one or more of OFPSs 200, 400, and/or 600, as described with reference to FIGS. 2A through 6. Single wafer-level lens 880 is bonded to a sensor layer 813 (e.g., a BW image sensor array) and provides OFPS 800 with a FOV 841 of a fingerprint sensing area. Wafer-level optic layer 812 has an upper substantially flat surface with an IRPF coating 811 (e.g., similar to IRPF coating 211 of FIGS. 2B and 2C). Single wafer-level lens 880 may allow OFPS 800 to image relatively large object heights, as compared to other optical configurations, such as multiple wafer-level lenses. Single wafer-level lens 880 focuses light from the fingerprint imaging area onto at least one sensor area 824 of sensor layer 813, and in certain embodiments, focuses light from the fingerprint imaging area onto substantially all of sensor layer 813.

Figure 9:
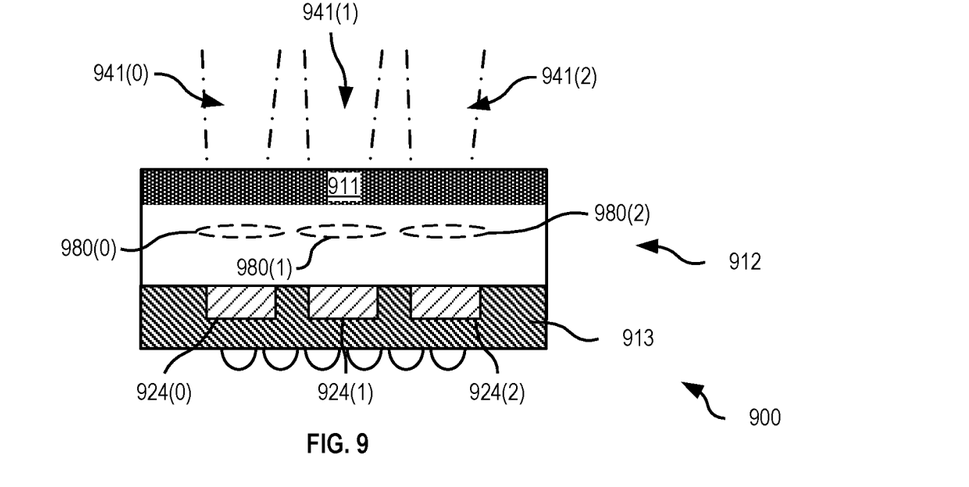
FIG. 9 is a schematic cross-sectional view of an OFPS with a continuous wafer-level optic layer that forms multiple wafer-level lenses, in embodiments.

FIG. 9 is a schematic cross-sectional view of OFPS 900 with a continuous wafer-level optic layer 912 that forms multiple wafer-level lenses 980(0)-(2), in embodiments. OFPS 900 may be an example of one or more of OFPSs 200, 400, an and/or 600, as described with reference to FIGS. 2A through 6. Wafer-level optic layer 912 is bonded to a sensor layer 913 (e.g., a BW image sensor array) and each wafer-level lens 980(0)-(2) provides a corresponding sensor area 924(0)-(2) of sensor layer 913 with a FOV 941 of at least part of a fingerprint sensing area. Wafer-level optic layer 912 has an upper substantially flat surface with an IRPF coating 911 (e.g., similar to IRPF coating 211 of FIGS. 2B and 2C). In certain embodiments, sensor layer 913 captures a single image (see raw image 1000 of FIG. 10) formed of a plurality of sub-images, each captured by a different sensor area 924 and corresponding wafer-level lens 980. Accordingly, OFPS 900 captures a relatively wide DFOV that covers a relatively large fingerprint imaging area, as compared to wafer-level optic layer 812 and single wafer-level lens 880 of FIG. 8. For example, each wafer-level lens 980 may have an entrance pupil (e.g., on the top of each of the respective lenses or at a top surface of wafer-level optic layer 912) that has a relatively small open aperture and relatively small footprint. Thus, to provide a larger image, the array of wafer-level lenses 980 and corresponding sensor areas 924 capture multiple sub-images and various image processing techniques and algorithms (e.g., as many be performed on special purpose computer processors) may be used to stitch the sub-images together to form a composite image of a fingerprint positioned at the fingerprint sensing area.

Figure 10:
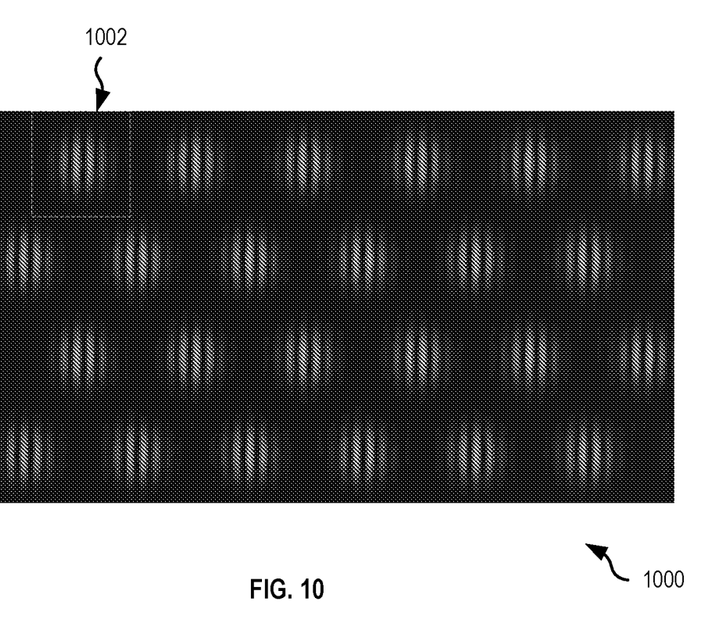
FIG. 10 shows a part of one example raw image captured by the OFPS of FIG. 9, in embodiments.

FIG. 10 shows a part of one example raw image 1000 captured by OFPS 900 of FIG. 9 prior to subsequent processing, such as stitching, to form a composite image. Raw image 1000 is formed of a plurality of sub-images; one example sub-image 1002 is indicated by broken lines. Each sub-image may align with a different part of the fingerprint scanning area, and may overlap with adjacent parts of the fingerprint scanning area captured by other wafer-level lenses 980 and sensor areas 924 that are adjacent to one another.

Figure 11:
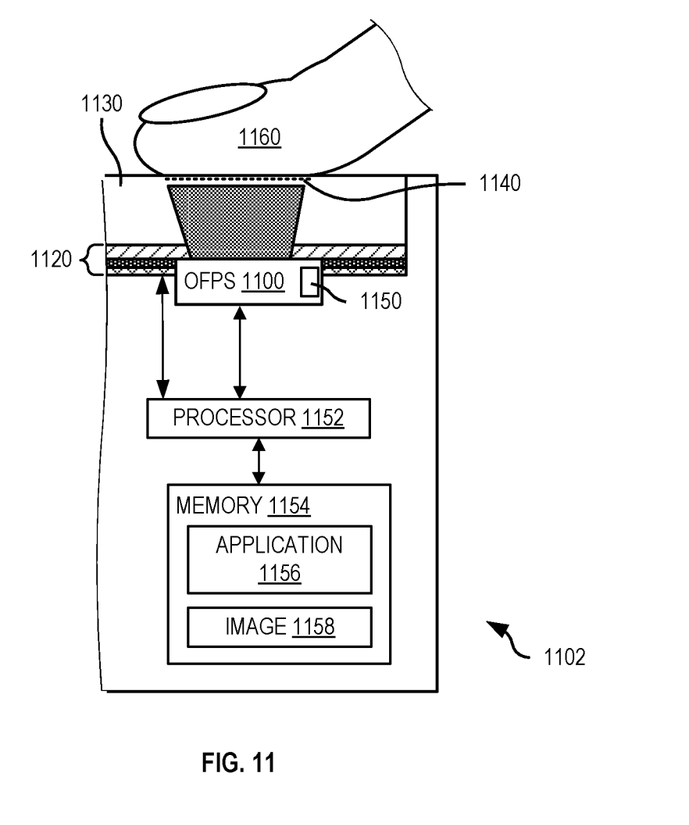
FIG. 11 is a schematic diagram illustrating an OFPS installed in a device used to capture a fingerprint of a finger positioned at a fingerprint sensing area above an LCD panel of the device, in embodiments.

FIG. 11 illustrates one example OFPS 1100 installed in a device 1102 for capturing a fingerprint of a finger 1160 positioned at a fingerprint sensing area 1140 above an LCD panel 1130 of device 1102. FIG. 11 only shows a portion of device 1102 which may be, for example, a smart phone. The OFPS 1100 is positioned below LCD panel 1130 that may include a cover glass (not shown) and below a backlight module 1120 that illuminates LCD panel 1130. The OFPS 1100 may represent one or more of OFPSs 200, 400, 600, 700, 800, and/or 900 described above with reference to FIGS. 2A through 9.

Device 1102 may include at least one processor 1152 that is communicatively coupled with backlight module 1120 and LCD panel 1130, OFPS 1100, and memory 1154. Memory 1154 is shown storing an application 1156 (e.g., software/firmware) that includes machine readable instructions that, when executed by processor 1152, control operation of device 1102 to capture a fingerprint image 1158 of a finger 1160 positioned on LCD panel 1130 at fingerprint sensing area 1140. Particularly, as described above, OFPS 1100 is positioned at an aperture in a reflector and metal shield of backlight module 1120 that allows light from finger 1160 to reach OFPS 1100, which is captured as fingerprint image 1158.

In one example of operation, application 1156 causes processor 1152 to activate an NIR light source 1150 of OFPS 1100, which illuminates finger 1160 at fingerprint sensing area 1140. Application 1156 then causes processor 1152 to control OFPS 1100 to capture at least one fingerprint image 1158. In certain embodiments, application 1156 may cause processor 1152 to process fingerprint image 1158 to stitch sub-images together as described above. Device 1102 is a mobile device and/or an electronic device such as one or more of a mobile phone, a tablet, a fingerprint scanner, or other such user equipment (UE), or may be another type of electronic device with an LCD display where it may be advantageous to capture a fingerprint image for authentication of a user.

Combination of Features

Features described above as well as those claimed below may be combined in various ways without departing from the scope hereof. The following enumerated examples illustrate some possible, non-limiting combinations:

(A1) An optical fingerprint sensor (OFPS) for use with a liquid-crystal display (LCD) panel having a backlight module includes a sensor layer; a wafer-level optic layer bonded to the sensor layer; and an infrared pass filter (IRPF) coating formed on a substantially flat top surface of the wafer-level optic layer; wherein the OFPS, when positioned beneath the backlight module, captures an image of a fingerprint sensing area on the LCD panel through an aperture in both a reflector and a metal shield of the backlight module.

(A2) In sensor (A1), the aperture is formed in the reflector and the metal shield during manufacture of the backlight module.

(A3) In sensors (A1) or (A2), the aperture is aligned with the fingerprint sensing area when the backlight module is coupled with the LCD panel.

(A4) In any of sensors (A1)-(A3), the wafer-level optic layer having a substantially flat top surface for coupling with a substantially flat surface of the backlight module within the aperture.

(A5) In any of sensors (A1)-(A4), the IRPF coating having properties that reflect visible light and allow infrared light to pass through.

(A6) In any of sensors (A1)-(A5), a reflectivity of visible light of the IRPF coating substantially matches reflectivity of visible light of the reflector.

(A7) In any of sensors (A1)-(A6), the sensor includes an infrared light source for projecting infrared light towards the fingerprint sensing area.

(A8) In the sensor of (A7), the infrared light source comprising one or more optical elements for directing the infrared light towards the fingerprint sensing area.

(A9) In any of sensors (A1)-(A8), the IRPF coating further comprising a glass surface.

(A10) In any of sensors (A1)-(A9), the wafer-level optic layer further comprising a single wafer-level lens for imaging the fingerprint sensing area to the sensor layer.

(A11) In the sensor of (A10), the single wafer-level lens being able to image an object with a greater height at the fingerprint sensing area as compared to imaging by multiple wafer-level lenses to image the object.

(A12) In any of sensors (A1)-(A11), the wafer-level optic layer includes an array of wafer-level lenses, wherein different ones of the array of wafer-level lenses form an image of a different part of the fingerprint sensing area to a different part of the sensor layer.

(A13) In the sensor of (A12), the array of wafer-level lenses being able to image an object at the fingerprint sensing area with a greater size and/or a greater resolution as compared to imaging the object using a single wafer-level lens.

(A14) In the sensor of (A12), each lens of the array of wafer-level lenses further includes an entrance pupil on top of the lens.

(A15) In the sensor of (A12), the array of wafer-level lenses being formed as island lenses in the wafer-level optic layer.

(A16) In the sensor of (A12), the sensor layer capturing a raw image of a finger at the fingerprint sensing area, where the raw image comprises a plurality of sub-images that may be processed using an algorithm that stitches the plurality of sub-images together to form an image of the finger.

(A17) In the sensor of (A16), wherein the algorithm comprises machine readable instructions that are executable by a processor of an electronic device that includes the LCD panel, the backlight module and the OFPS.

(A18) In any of sensors (A1)-(A17), the OFPS being positioned directly beneath the fingerprint sensing area.

(A19) In any of sensors (A1)-(A18), the OFPS captures an image of a finger pressed against the fingerprint sensing area via the LCD screen.

(A20) In any of sensors (A1)-(A19), further including a backlight shield configured to block at least a portion of incoming light from the backlight module.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An optical fingerprint sensor (OFPS) for use with a liquid-crystal display (LCD) panel having a backlight module, comprising:
    a sensor layer;
    a wafer-level optic layer bonded to the sensor layer; and
    an infrared pass filter (IRPF) coating formed on a substantially flat top surface of the wafer-level optic layer;
    wherein the OFPS, when positioned beneath the backlight module, captures an image of a fingerprint sensing area on the LCD panel through an aperture in both a reflector and a metal shield of the backlight module.

2. The OFPS of claim 1, wherein the aperture is formed in the reflector and the metal shield during manufacture of the backlight module.

3. The OFPS of claim 2, wherein the aperture is aligned with the fingerprint sensing area when the backlight module is coupled with the LCD panel.

4. The OFPS of claim 1, the wafer-level optic layer having a substantially flat top surface for coupling with a substantially flat surface of the backlight module within the aperture.

5. The OFPS of claim 1, the IRPF coating having properties that reflect visible light and allow infrared light to pass through.

6. The OFPS of claim 1, wherein reflectivity of visible light of the IRPF coating substantially matches reflectivity of visible light of the reflector.

7. The OFPS of claim 1, further comprising an infrared light source for projecting infrared light towards the fingerprint sensing area.

8. The OFPS of claim 7, the infrared light source comprising one or more optical elements for directing the infrared light towards the fingerprint sensing area.

9. The OFPS of claim 1, the IRPF coating further comprising a glass surface.

10. The OFPS of claim 1, the wafer-level optic layer further comprising a single wafer-level lens for imaging the fingerprint sensing area to the sensor layer.

11. The OFPS of claim 10, the single wafer-level lens being able to image an object with a greater height at the fingerprint sensing area as compared to imaging by multiple wafer-level lenses to image the object.

12. The OFPS of claim 1, the wafer-level optic layer further comprising an array of wafer-level lenses, wherein different ones of the array of wafer-level lenses form an image of a different part of the fingerprint sensing area to a different part of the sensor layer.

13. The OFPS of claim 12, the array of wafer-level lenses being able to image an object at the fingerprint sensing area with a greater size and/or a greater resolution as compared to imaging the object using a single wafer-level lens.

14. The OFPS of claim 12, each lens of the array of wafer-level lenses further comprising an entrance pupil on top of the lens.

15. The OFPS of claim 12, the array of wafer-level lenses being formed as island lenses in the wafer-level optic layer.

16. The OFPS of claim 12, the sensor layer capturing a raw image of a finger at the fingerprint sensing area, where the raw image comprises a plurality of sub-images that are processed using an algorithm that stitches the plurality of sub-images together to form an image of the finger.

17. The OFPS of claim 16, wherein the algorithm comprises machine readable instructions that are executable by a processor of an electronic device that includes the LCD panel, the backlight module and the OFPS.

18. The OFPS of claim 1, the OFPS being positioned directly beneath the fingerprint sensing area.

19. The OFPS of claim 1, wherein the OFPS captures an image of a finger pressed against the fingerprint sensing area via the LCD panel.

20. The OFPS of claim 1, further comprising a backlight shield configured to block at least a portion of incoming light from the backlight module.

* * * * *